Patented Aug. 3, 1954

2,685,603

UNITED STATES PATENT OFFICE 2,685,603

METHOD OF PRODUCING ALKENETHIONO-PHOSPHONIC DICHLORIDES

Edward N. Walsh, Chicago Heights, Ill., assignor to Victor Chemical Works, a corporation of Illinois No Drawing. Application March 19, 1953, Serial No. 343,503

5 Claims. (Cl. 260—543)

This invention relates to the preparation of alkenethionophosphonic dichlorides.

In Woodstock Patents 2,471,472 and 2,495,799 there is described the preparation of organic phosphorus tetrachlorides by reacting olefins with $PCl_5$. These patents also disclose the preparation of the corresponding oxydichloride and sulfodichloride compounds by reacting further with $P_2O_5$ and $P_2S_5$, respectively. These further compounds are the alkenephosphonic and thiophosphonic dichlorides.

In the processes set out in the above patents the yield of the alkenephosphonic compounds is relatively high. However, the yield of the alkenethiophosphonic dichlorides is ordinarily too small to be commercially practicable. I have discovered that excellent yields are achieved by merely adding an iodine catalyst to the reactants. The reacting conditions are otherwise unchanged. Because the other conditions are unchanged, the disclosures of these Patents 2,471,472 and 2,495,799 are specifically included herein by reference. The use of a small amount of iodine catalyst in the same reaction will unexpectedly increase the yield of thionophosphonic dichloride to as high as 95% in many cases without otherwise complicating the process. That the presence of iodine is truly catalytic is shown by the fact that as little as .02% of the total weight of the reactants will produce the increased yield as shown in the examples. Increasing the amount of iodine to as high as 0.1% has shown no increase in yield. Thus, trace amounts of iodine appear to be effective in this reaction.

It is well known that unsymmetrical olefins having a terminal double bond react with $PCl_5$ to form phosphorus addition products. These products are generally 2-chloro-alkanephosphonic tetrachlorides although in some instances hydrogen chloride is lost during the reaction so that alkenephosphonic tetrachlorides result. This is immaterial to the process of this invention, however, since either of the products may be reacted with $P_2S_5$ in the presence of an iodine catalyst to give good yields of the corresponding product. These reactions are illustrated by the following equations:

1.
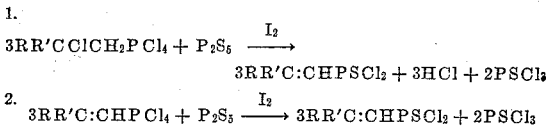

2.
$$3RR'C{:}CHP Cl_4 + P_2S_5 \xrightarrow{I_2} 3RR'C{:}CHPSCl_2 + 2PSCl_3$$

From these equations it can be seen that the final compound is an alkenethionophosphonic dichloride whether the HCl is lost before or during the $P_2S_5$ reaction, i. e. whether the $PCl_5$-olefine reaction product is a chloroalkyl-$PCl_4$ compound or an alkenyl-$PCl_4$ compound.

Although the reaction is believed to proceed as set out in the above equations, I do not wish to be bound by this theory. Thus, the method of this invention is perhaps more accurately described as comprising reacting an addition product of $PCl_5$ and a mono-olefin of the formula $RR'C{=}CH_2$, with $P_2S_5$ in the presence of an iodine catalyst.

Olefins which are suitable for the preparation of the starting organic phosphorus tetrachlorides of the present invention may be represented by the formula $RR'C{:}CH_2$ in which R is hydrogen, alkyl or aryl and R' is alkyl or aryl. Thus suitable olefins include propylene, butene-1, isobutylene, di-isobutylene, 2,2-diphenylethylene, styrene, alpha chlorostyrene, and the like.

The following examples illustrate the improved process of this invention:

*Example 1.*—Into an apparatus consisting of a three necked flask equipped with an oil-sealed stirrer, thermometer, dropping funnel and vent line containing a calcium chloride tube were placed 417.0 g. (2 moles) of $PCl_5$ and 1000 ml. of $PCl_3$. The mixture was cooled to below 0° C. by means of a cooling bath. 448.0 g. (100% mole excess) of di-isobutylene were then added through the dropping funnel over a period of three hours while stirring the contents and controlling the temperature of the mixture below 5° C. To the reaction product formed by the above reaction was added approximately 0.2 g. of iodine crystals as a catalyst and 1.0 g. of trinitrobenzene as a polymerization inhibitor. 148 g. (0.66 mole) of $P_2S_5$ were then added to the flask, and the temperature was allowed to reach 25° C. during the next 1½ hours and then 35° C. for the next two hours. It was then allowed to cool to room temperature while stirring over a sixteen hour period. It was then heated to 40° C. for one hour and then to 60° for one hour and allowed to return to room temperature. The mixture was then transferred to a distilling apparatus and all low boiling solvents removed by heating at 100° C. and reducing the pressure to 3 mm. The iso-octene thionophosphonic dichloride product was then distilled at a pressure of 1 mm. of mercury collecting the fraction in the 86–95° C. vapor temperature range. This product weighed 316.6 gm. (64.7% of theoretical)

and had an index of refraction $N_D^{25}$—1.5323. Analysis showed the product contained—

| | Per cent | | Per cent |
|---|---|---|---|
| P | 12.6 | Theoretical | 12.7 |
| S | 13.0 | | 13.1 |
| Cl | 29.7 | | 29.2 |

*Example 2.*—417 gm. (2 moles) of PCl$_5$ and 1000 ml. of PCl$_3$ were placed in a three necked flask equipped as in Example 1. To this mixture 333 g. (60% mole excess) of styrene were added dropwise over a three hour period while controlling the temperature below 25° C. To the addition product thus made were added approximately 0.2 gm. iodine crystals as a catalyst and approximately 0.2 gm. of trinitrobenzene as a polymerization inhibitor. 148 gm. of P$_2$S$_5$ were then added and the mixture was allowed to stir at room temperature for 40 hours. At the end of this time all solids had dissolved. The liquid was transferred to a distilling flask and the solvent removed as in Example 1. The product was then distilled collecting the fraction at a vapor temperature of 140–150° C. at a pressure of 1–2 mm. of mercury. This fraction, styrene thionophosphonic dichloride, weighed 401 gm. (84.6% of theoretical) had an index of refraction $N_D^{25}$—1.6412 and analyzed: P—12.4%, S—13.5%, Cl—32.2%. (Theoretical analysis P—13.1%, S—13.5%, Cl—30.0%.)

*Example 3.*—Into a flask equipped as in Example 1 were placed 1000 ml. PCl$_3$ and 417 g. (2.0 moles) PCl$_5$ and the mixture was cooled to 20–25° C. A gas inlet tube was then attached to the reaction flask and a distilling flask containing 180 g. (60% excess) isobutylene was fastened to the other end of the tube. The isobutylene was allowed to distill slowly into the reaction flask over a three hour period while controlling the temperature at 20–25° C. To the reaction product thus formed was added 0.2 g. iodine crystals, 0.2 g. trinitrobenzene and 148 g. (0.66 mole) P$_2$S$_5$ and the mixture was allowed to stir sixteen hours at room temperature. The mixture was then stirred at 35° C. for six hours, 40° C. for one hour, room temperature for another sixteen hours, and then transferred to a glass distilling apparatus. The solvents present were removed by distilling at 50° C. down to an absolute pressure of 2 mm. The product was then distilled at a vapor temperature of 80–86° C. at a pressure of 3 mm. The thionophosphonic dichloride product weighed 361.5 g. (95.6%) and had an index of refraction $N_D^{25}$—1.5560.

The reaction conditions shown in the above examples may be varied without departing from the principles of the invention. For example, instead of a PCl$_3$ reaction and solvent medium, other inert solvents such as benzene, toluene, carbon tetrachloride, phosphorus oxychloride, the chlorinated hydrocarbons, and the like may be used. Also it is possible to carry out the reaction without the use of solvents by proper selection of mechanical mixing devices and reaction vessels. Also, the temperatures may be varied according to the nature of the reactants, but should at all stages be held below the decomposition point of the reactants and products. Lower temperature limits are not critical.

Elemental iodine is not the only catalyst that can be used in this invention as other compounds that liberate iodine under the conditions of the reaction are also suitable. These compounds include potassium iodide, calcium iodide, phosphorus tri-iodide, iodine monochloride, and similar compounds.

Where the starting material is originally prepared by reaction of unsaturated hydrocarbons and phosphorus pentachloride, and excess of the unsaturated hydrocarbon is not detrimental; in fact, it may serve as a solvent and reaction medium for the subsequent reactions.

The thionophosphonic dichlorides produced in accordance with the above procedure are valuable intermediates for the production of phosphonic acids, esters, amides, and similar compounds.

Having described my invention as related to embodiments thereof, it is my intention that the invention be not limited by any of the details of description, unless otherwise specified, but rather be construed broadly within its spirit and scope as set out in the accompanying claims.

I claim:

1. The method of making an alkenethionophosphonic dichloride which comprises reacting an addition product of PCl$_5$ and a mono-olefin of the formula RR'C=CH$_2$ wherein R is a member of the class consisting of hydrogen, alkyl and aryl, and R' is a member of the class of alkyl and aryl, with P$_2$S$_5$ in the presence of an iodine catalyst.

2. The method of claim 1 wherein the iodine is present in an amount between from about .01–.1% by weight of the reactants.

3. The method of claim 1 wherein the mono-olefin is styrene.

4. The method of claim 1 wherein the mono-olefin is isobutylene.

5. The method of claim 1 wherein the mono-olefin is di-isobutylene.

No references cited.